United States Patent [19]

Watanabe

[11] Patent Number: 5,044,925
[45] Date of Patent: Sep. 3, 1991

[54] INJECTION-COMPRESSION MOLD
[75] Inventor: Seiichi Watanabe, Kanagawa, Japan
[73] Assignee: Fuji Photo Film Co., Ltd., Kanagawa, Japan
[21] Appl. No.: 403,240
[22] Filed: Sep. 1, 1989
[30] Foreign Application Priority Data Sep. 5, 1988 [JP] Japan ................... 63-221570

[51] Int. Cl.$^5$ ............................ B29C 45/03
[52] U.S. Cl. .................... 425/542; 264/328.1; 264/328.7; 425/408; 425/555; 425/DIG. 127
[58] Field of Search .............. 425/451.2, 590, 542, 425/555, 408, 589, DIG. 127, DIG. 223, 406; 264/328.1, 328.7

[56] References Cited

U.S. PATENT DOCUMENTS 2,443,826  6/1948  Johnson ........................ 425/236
3,950,119  4/1976  Reichenbach ................. 425/589
4,013,392  3/1977  Smith ............................ 425/451.2

FOREIGN PATENT DOCUMENTS 62-116125  5/1987  Japan ........................... 425/451.2
1166083   10/1969  United Kingdom .......... 425/451.2

Primary Examiner—Jay H. Woo
Assistant Examiner—James P. Mackey
Attorney, Agent, or Firm—Sughrue, Mion, Zinn Macpeak & Seas

[57] ABSTRACT

An injection-compression mold having a stationary part and a movable part which are used for injection-molding a molten thermoplastic resin, at least one spring member with one end fixed to at least one of the mold parts and the other arranged so that it can abut against the opposite mold part when the mold is clamped in order that the bias force of the spring member to absorb the clamp force of a molding machine.

6 Claims, 4 Drawing Sheets

FIG. 2(a)
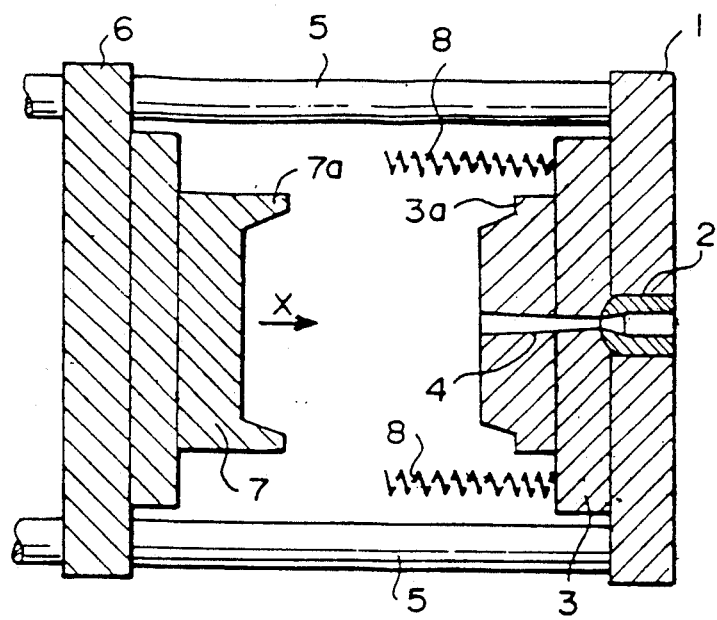
FIG.2(b)
FIG.2(c)
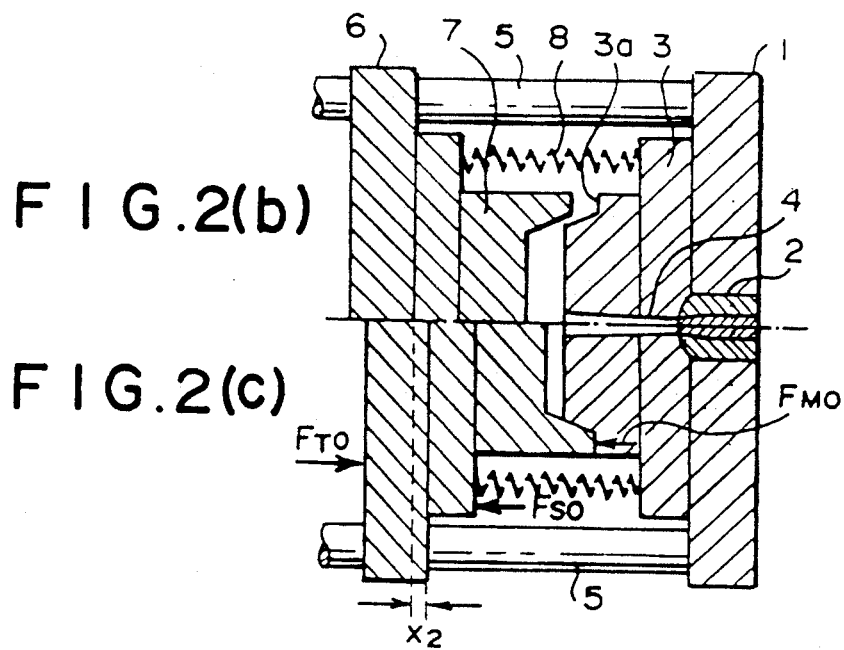

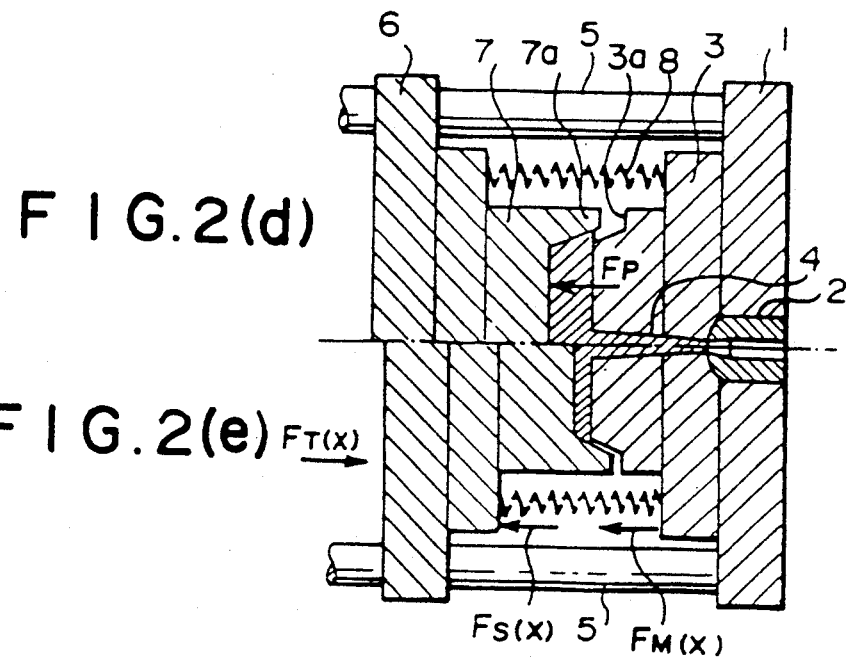
FIG.2(d)
FIG.2(e)
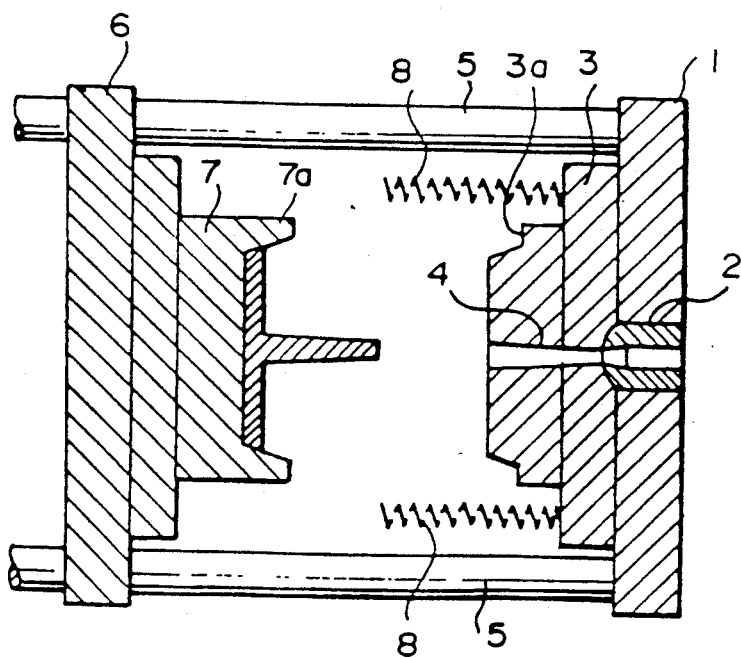
FIG.2(f)

INJECTION-COMPRESSION MOLD

BACKGROUND OF THE INVENTION

1. Field of the Invention

The present invention relates to a construction of a mold for use in an injection-molding optical data recording disk substrate or optical part such as a lens and more particularly to an injection-compression mold for implementing injection-compression molding by changing a clamp force in conformity with the condition in which a cavity is filled with a resin.

2. Description of the Prior Art

Optical data recording disk substrates as recording media, including optical audio disks, video disks, magneto-optic disks and the like, are high-quality, high precision molded products which require not only excellent optical properties but also dimensional precision. In other words, any of these molded products has to be free from sinkmarks, made to inherit the same configuration as that of a mold, immune from residual deformation and stress, provided with a uniform refractive index, particularly a smaller birefringence index as the birefringence index results from incident light and reflecting light which are out of phase.

In order to satisfy the aforementioned requirements, a number of proposals have heretofore been made. More specifically, Japanese Patent Laid-Open No. 73058/1976 discloses a means for improving a molding machine by conducting clamping on a multistage basis for compression; Japanese Patent Laid-Open No. 137625/1985 discloses a method of compressing a mold by providing a hydraulic cylinder between a stationary or movable plate and a mold part; Japanese Patent Laid-Open No. 137626/1985 discloses the provision of such a hydraulic cylinder between one side of the stationary plate or toggle support and the end of a tie bar, that side being fitted with no mold part; and Japanese Patent Laid-Open No. 171118/1985 discloses a method of optionally adjusting clamp force during injection molding by forming an extra-small gap on the outer periphery of a mold cavity.

With respect to a means for improving a mold, Japanese Patent Laid-Open No. 241115/1986 discloses a method of controlling a compression molding margin by providing a pressure-receiving plate for supporting a movable part with a hydraulic unit to push the movable part and inserting a space in between the tip of guide rod and pressure-receiving plate; Japanese Patent Laid-Open No. 109618/1987 proposes a method of continuously changing clamp pressure within a predetermined period of time; and Japanese Patent Laid-Open No. 137747/1987 discloses a method of improving heat treatment.

Of the aforementioned proposals, Japanese Patents Laid-Open Nos. 73058/1976, 137625/1985, 137626/1985 and 241115/1986 are intended to control the compressive clamp force in the case of an injection-compression molding machine using a toggle type clamp mechanism and have posed problems in that the molding machine and the mold tend to become complicated in construction and therefore costly.

On the other hand, the disclosures made by Japanese Patent Laid-Open Nos. 171118/1985 and 109618/1987 relate to an injection-compression molding machine using a direct pressure type clamp mechanism. Although the mold requires no special construction in order to directly control the pressure of a clamp ram for generating clamp force, the problem is that its response to compression is low, which also makes costly the control system for controlling the compressive force. In addition, it is necessary to control the compressive force during the process of filling the cavity with a resin or cooling it. Such control can hardly be possible with high reproducibility and quick response and besides large cost has been incurred to realize the control. Moreover, a small gap is normally provided between the abutting faces of the outer peripheries of the mold parts (hereinafter called PL planes) because compressing strokes have to be given during the injection-compression molding. For this reason, the movable part and the stationary part are cantilevered with their respective platens and they tilt under their own weight when the clamp force is horizontally directed. As a result, the lower section of the molded piece tends to become thicker than that of the upper section. The disadvantage is that optical parts such as optical data recording disk substrates and lenses are unable to retain uniform precise thickness.

SUMMARY OF THE INVENTION

The present invention is aimed at solving the foregoing problems and it is therefore an object of the invention to provide an inexpensive, simple injection-compression mold capable of controlling clamp force smoothly with excellent reproducibility and respondency in conformity with the condition in which a cavity is filled with a resin to obtain molded pieces of good quality.

In order to accomplish the aforementioned object, an injection-compression mold, comprising a stationary part and a movable part which are used for injection-molding a molten thermoplastic resin, is characterized in that at least one spring member with one end fixed to at least one of the mold parts and the other arranged so that it can abut against the opposite mold part when the mold is clamped, is provided therein in order that the force of pressing a mold cavity is decreased by utilizing the bias force of the spring member to absorb the clamp force of a molding machine.

With this arrangement, the spring member for receiving the clamp force of the mold is used to absorb most of the clamp force during clamping. The force of pressing the mold cavity because of the clamp force is substantially decreased to facilitate the opening of the mold against the resin pressure derived from injection. Since the sum of the bias force of the spring member and the force of pressing back the mold cavity because of the resin pressure is always balanced with the clamp force of the molding machine, the spring member extends to cause the clamp force to decrease as the mold opens while the resin pressure is applied to the cavity during the resin injection. The force of pressing the mold cavity is substantially increased. The mold stops opening in a position where the force of pressing the mold cavity is balanced with the resin pressure and a following cooling step is taken. In the cooling step, the resin shrinks as it cools down and makes the mold thus opened gradually shut. The spring member is subsequently compressed, whereas the force received by the spring member relative to the clamp force decreases. The compressive force used to press the mold cavity is therefore decreased substantially.

Since the sum of the bias force of the spring member and the force of pressing back the cavity as a counterforce is balanced with the clamp force, the compressive force increases or decreases in conformity with the resin condition when the spring member expands or contracts. The compressive force is thus controlled in conformity with the resin condition.

BRIEF DESCRIPTION OF THE DRAWINGS

FIGS. 2(a) through 2(f) are vertical sectional views illustrating processing steps according to the present invention.

DESCRIPTION OF THE PREFERRED EMBODIMENTS

Referring to the accompanying drawings, a description will subsequently be given of an injection-compression mold embodying the present invention.

Figure 1:
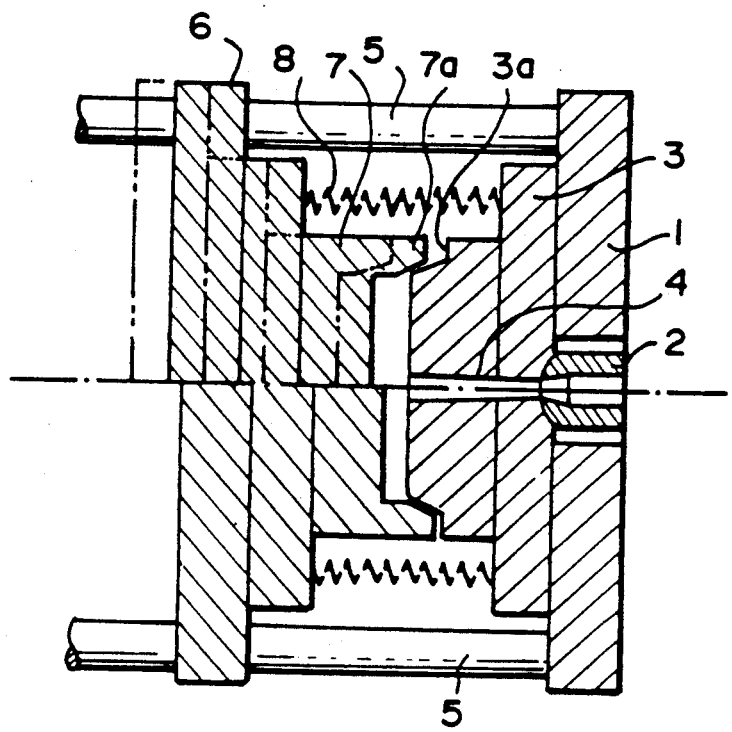
FIG. 1 is a vertical sectional view of a molding machine equipped with an injection-compression mold embodying the present invention.

FIG. 1 shows by way of example a construction of an injection-compression molding machine with a mold as mounted therein according to the present invention. A stationary platen 1 is fixedly mounted in the molding machine and a nozzle 2 provided in the center thereof is used to inject molten material. A stationary part 3 is fitted to one side of the stationary platen 1 and a sprue hole 4 bored in the center thereof is used to allow the molten plastic material injected from the nozzle 2 to pass therethrough. Moreover, tie bars 5 are fixed to four places near the respective corners of the stationary platen 1 onto which the stationary part 3 is fitted, the tie bars 5 being fixed thereto at right angles to the stationary platen 1. A movable platen 6 is slidably guided by the tie bars 5. A movable part 7 is fitted to one side of the movable platen 6 facing the stationary platen 1. Stepped planar sections 3a formed on the outer periphery of the cavity face of the stationary part 3 and stepped projections 7a formed on the outer periphery of the cavity face of the movable part 7 mate with each other in the form of a socket to form PL planes. One of the ends of each of the springs 8 are fixed to four corners of the outer periphery of the base of the stationary part 3, respectively. The other ends of the springs 8 are extended at right angles to the stationary part 3 and arranged so that they abut against the four corners of the base of the movable part 7, respectively. The open ends of the springs 8 are caused to abut against the base of the movable part 7 when clamping is made.

The operation of this molding machine will be described with reference to FIGS. 2 and 3.

Given a spring constant of $K_S$ produced by synthesizing all of the four springs 8, $$K_S = F_T/S \ldots \quad (1)$$

$$F_T = D \times P \ldots \quad (2)$$

$$S = t \times \alpha \ldots \quad (3)$$

$F_T$ is clamp force (kgf), S is compressive stroke (cm), D is projected area of molded piece (cm$^2$), P is resin pressure (150 kgf/cm$^2$–600 kgf/cm$^2$), t is thickness of the piece (cm) and $\alpha$ is thickness constant 0.01–0.3.

(A) Force balance upon completion of clamping:

The movable platen 6 is moved by a drive source (not shown) in direction of arrow X in the open state of the mold shown in FIG. 2(a) to make the movable part 7 abut against the open ends of the springs 8 as shown in FIG. 2(b). When the clamp force is applied so as to move the movable platen 6 in direction of arrow X further, the edge faces of the stepped projections 7a of the movable mold 7 are, as shown in FIG. 2(c), forced to abut against the respective stepped planar sections 3a on the outer periphery of the stationary part 3. The clamping is thus completed. The springs 8 undergo elastic compression at this time. The force balance in such a state as shown in FIG. 2(c) is expressed by Eq. (4).

$$F_{TO} = F_{SO} + F_{MO} = K_S \times x_2 + K_M \times x_1 \ldots \quad (4)$$

where $F_{TO}$ = clamp force (kgf) upon completion of clamping.

$$F_{SO} = K_S \times x_2$$

$$F_{MO} = K_M \times x_1$$

where $F_{SO}$ = force applied to the springs upon completion of clamping (kgf), $F_{MO}$ = force applied to the mold upon completion of clamping (kgf), $K_M$ = spring constant of the mold (kgf/cm), $x_2$ = amount of deformation of the springs upon completion of clamping (cm) and $x_1$ = amount of deformation of the mold upon completion of clamping (cm).

However, $x_2 \gg x_1$. Incidentally, $F_{MO} > 0$ when $x_1 > 0$ when the PL planes of the opposite mold parts remain press-joined upon completion of clamping. Moreover $K_M \gg K_S \gg KT$ ($K_T$ = spring constant of clamp system) and $x_2 \gg x_1 = 0$. When both mold parts have not yet been press-joined upon completion of clamping, $$F_{MO} = 0, \ x_1 = 0.$$

(B) Force balance during resin injection:

When the resin is injected via the sprue hole 4 into a cavity upon completion of clamping, the resin pressure is applied to the cavity and both mold parts 3, 7 are forced to open (as shown in FIG. 2(d)) because of the force $F_P$ derived from the pressure. As the springs 8 extend at this time, their bias force is decreased. Incidentally, the force $F_P$ derived from that pressure is what acts in between the resin and the cavity in both directions. The force balance during the resin injection is given by Eqs. (5), (6) below. In this case, however, the open amount between both mold parts 3, 7 is represented by the distance x (cm) from the point at which the clamping is completed.

(B-1) Until the PL planes are spaced out after the resin injection:

$$(0 < x < x_1)$$

$$F_T(x) = F_S(x) + F_M(x) + F_P \ldots \quad (5)$$

$$\begin{aligned} F_T(x) &= F_{TO} + K_T \times x \\ F_S(x) &= K_S \times (x_2 - x) = F_{SO} - K_S \times x \\ F_M(x) &= K_M \times (x_1 - x) = F_{MO} - K_M \times x \end{aligned} \quad (6)$$

where $F_T(x)$=clamp force (kgf), $F_S(x)$=force applied to the springs (kgf), $F_M(x)$=force applied to the mold (kgf) and $K_T$=spring constant of the clamp system of the molding machine.

In Eqs. (5), (6) above, $F_T(x)$ is substantially constant in the case of a straight hydraulic molding machine, whereas $K_T << K_S << K_M$ in the case of a toggle type molding machine. Since $K_T \times X \approx 0$ can be assumed within the range of $s > x \approx 0$, $F_T(x) = F_{TO}$ if $F_T(x)$ is assumed constant. Eq. (6) has Eq. (5) conform to Eq. (5') below.

$$\begin{aligned} F_T(x) &= F_{SO} + F_{MO} - (K_S + K_M) \times x + F_P \\ &= F_{TO} - (K_S + K_M) \times x + F_P \end{aligned} \quad (5')$$

From Eq. (5') and $F_T(x) = F_{TO}$, Eq. (7) below is obtainable.

$$F_P = (K_S + K_M) \times x \ldots \quad (7)$$

This Eq. (7) shows that the open amount between both mold parts 3, 7 is small in comparison with a rise in resin pressure within the range of $0 < x < x_1$. When $x = x_1$, the PL planes of the mold parts 3, 7 separate.

(B-2) Until the springs separate from the moving platen after the PL planes of the mold have been spaced out:

$$(x_1 < x < x_2)$$

The force $F_M(x)$ and $K_T \times x$ applied to the mold parts 3, 7 becomes zero during this time and therefore Eqs. (5), (6) indicating the force balance are replaced with Eqs. (8), (9) below:

$$F_T(x) = F_S(x) + F_P \quad (8)$$

$$\begin{aligned} F_T(x) &= F_{TO} = F_{SO} + F_{MO} \\ F_S(x) &= K_S \times (x_2 - x) = F_{SO} - K_S \times x \end{aligned} \quad (9)$$

From Eq. (9), Eq. (8) becomes Eq. (8') below.
Since $F_{SO} + F_{MO} = F_{SO} - K_S \times x + F_P$, $$F_{MO} = F_P - K_S \times x \ldots \quad (8')$$

$$F_P = F_{MO} + K_S \times x \ldots \quad (10)$$

Eq. (10) shows that the bias force of the springs decreases as the PL planes of the mold separate; i.e. $K_S << (K_S + K_M)$. This means the mold parts 3, 7 are readily separated as the resin pressure $F_P$ rises. Actually, the distance between the mold parts increases as the resin pressure $F_P$ changes. This fact features this embodiment.

$F_{MO}$ in this case represents the resin pressure when the PL planes of the mold parts 3, 7 begin to separate.

Since $x_1 = 0$ in case the PL planes do not come in contact with each other upon completion of clamping, $F_{MO}$ at this time becomes zero. Eq. (10) therefore conforms to Eq. (10') below.

$$F_P = K_S \times x \ldots \quad (10')$$

In other words, the mold parts 3, 7 allow the mold to open in conformity with the spring constant $K_s$ simultaneously with the resin injection.

(B-3) After the springs separate from the movable mold $(x_2 < x)$:

The clamp force $F_T(x)$ and the resin injection pressure $F_P$ balance in this case and Eq. (11) below is justified.

$$F_T(x) = F_P \ldots \quad (11)$$

Since $F_T(x) = F_{TO} + K_T \times x$ as shown in Eq. (6), Eq. (11) may be converted to Eq. (12) below.

$$F_P = F_{TO} + K_T \times x \ldots \quad (12)$$

This Eq. (12) shows that the mold is opened up to a position where the resin injection pressure $F_P$ and the clamp force of the molding machine are balanced as the springs separate.

Since the spring constant $K_T \approx 0$ in the case of a straight hydraulic molding machine and $K_T$ is small even in the case of a toggle type molding machine, the open amount between the mold parts 3, 7 increases as the resin pressure $F_P$ rises. If the clamp force $F_T(x)$ is relatively smaller than the resin pressure $F_P$, the molded piece tends to produce flashes. In this embodiment, however, the clamp force $F_T(x)$ is arranged so that the mold parts 3, 7 are not separated from each other to that extent.

As set forth above, the mold is opened in proportion to the resin pressure as the step of injecting the resin progresses.

(C) Force balance during the cooling of resin:

When a cooling step is initiated subsequent to the termination of the resin injection into the cavity, the mold parts 3, 7 thus separated are caused to move nearer to each other gradually as the resin cools and shrinks as shown in FIG. 2(e). The force applied to the springs 8 accordingly increases, so that the force of narrowing the cavity, i.e. pressing the resin decreases.

The force $F_P$ applied by the resin to the cavity in this step is represented as that which satisfies the aforementioned Eqs. (12)→(10)→(7) as the open amount x changes as $x > x_2 \rightarrow x_2 > x > x_1 \rightarrow x_1 > x > 0$.

Figure 3:
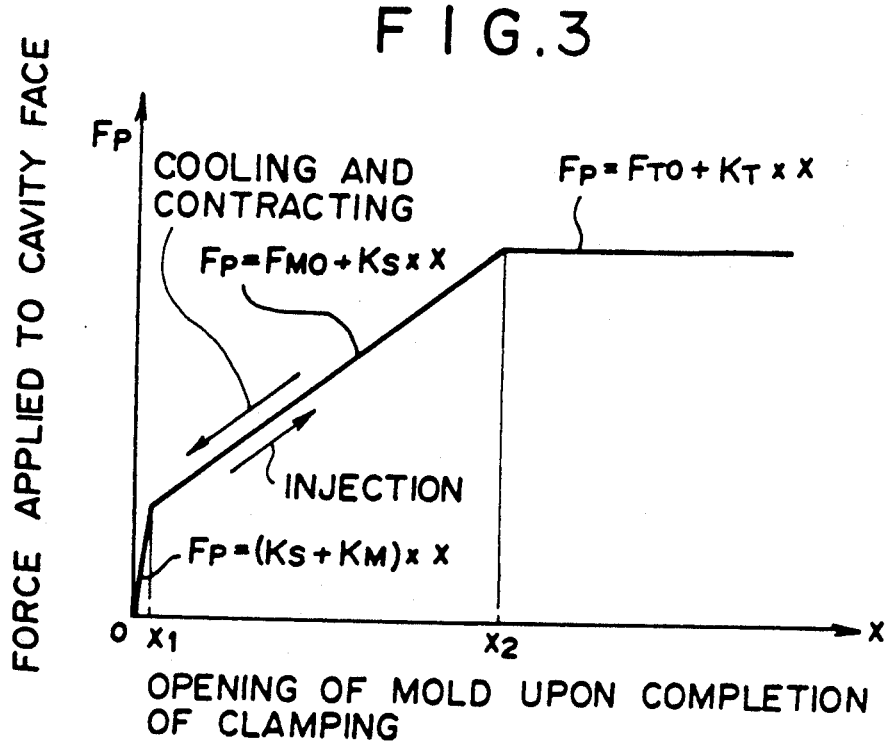
FIG. 3 is a graph illustrating the relation between the operation of injection-compression and compressive force during the processing steps of the present invention.

FIG. 3 shows changes of the resin injection pressure $F_P$ applied to the cavity face as the open amount x changes. As shown in FIG. 3, it is possible to change the force of pressing the cavity in conformity with the amount of resin supplied to the cavity until the resin is cooled after it has been injected. The effect of compression is particularly conspicuous within the range of $x_1 < x < x_2$ in terms of the open amount of mold until the springs 8 separate from the movable mode after the cavity faces of the mold parts 3, 7 have separated. Since the springs 8 are employed to support both mold parts 3, 7, moreover, the platens 1, 6 become immune from supporting the mold parts 3, 7 in the form of a cantilever to ensure that they are kept moving in parallel to each other vertically. High precision molded pieces are thus obtainable. FIG. 2(f) shows a state in which a molded piece is taken out after the mold is opened.

A description will subsequently be given of an experiment on the formation of a 130-φ optical disk substrate by way of example. This experiment was conducted under the following conditions:

With respect to the springs 8, one of the ends of each of the four φ-40 coil springs were fitted to the stationary part 3, respectively. The spring constant $K_S$ produced by synthesizing the springs 8, the projected area of a molded piece D, the resin pressure P, the thickness of the piece t and the thickness constant α were set as follows:

$K_S$ 3,850,000 kgf/cm, D=132 cm², P=350 kgf/cm², t=0.12 cm, α=0.1.

The clamp force $F_T$ and the compressive stroke S conform to $$F_T = D \times P = 46,200 \text{ kgf}$$

$$S = t \times \alpha = 0.012 \text{ cm}$$

The clamp force was set at 46.2 tons so that the springs 8 contracted by 0.12 mm with the gap between the PL planes being set at 0.01 mm then.

In the case of this mold, the springs 8 abutted against the movable part 7 at 0.12 mm before the completion of clamping and contracted by 0.12 mm from that position while receiving the clamp force $F_T$. The clamping was terminated in such a state that the springs 8 as a whole were responsible for the clamp force $F_{TO}$=46.2 tons. $F_{TO} = F_{so} = 46.2$ tons, i.e. the force of pressing the cavity then became $F_{TO} - F_{so} = 0$.

Molten resin was then injected into the cavity and, when the movable part 7 was forced back by the resin injection pressure $F_P$, the gap between the PL planes of the mold parts 3, 7 widened. The movable part 7 was forced by the injection pressure $F_P$ to move back by 0.12 mm when the injection was terminated. The springs 8 were then completely extended and, as they had not shared in the force ($F_s(x)=0$), the force ($F_T(x) - F_s(x)$) applied to the cavity was equal to a clamp force of 46.2 tons.

The gap between the movable part 7 and the stationary part 3 contracted by 0.1 mm because of the compressive force and the shrinkage of the resin during 6 seconds of cooling time. The compressive force amounted to 7.7 tons when the cooling was terminated.

Figure 4:
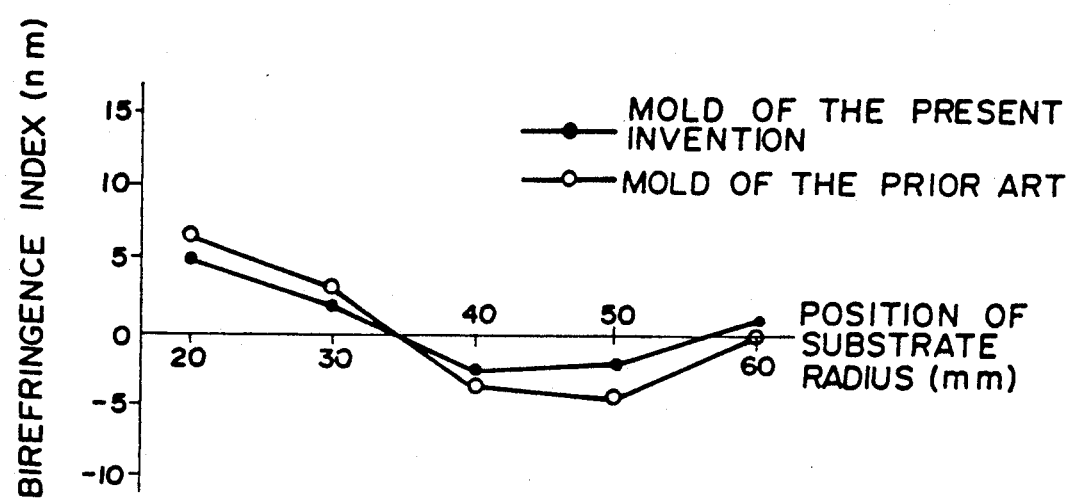
FIG. 4 is a graph illustrating a birefringence index of each part of a substrate injection-compression molded according to the present invention and a conventional method.

FIG. 4 shows a change of birefringence index of the optical disk substrate obtained in the above-described embodiment in comparison with what is obtained through a conventional method. Table 1 also shows differences between the thickness of the upper part of the substrate and that of its lower part in comparison with that which is obtained through the conventional method.

TABLE 1

| | Upper thickness: | Lower thickness: | Difference: |
|---|---|---|---|
| Substrate prepared by mold of present invention: | 1.192 mm | 1.192 mm | 0.000 mm |
| Substrate prepared through conventional method: | 1.187 mm | 1.195 mm | 0.008 mm |

Figure 5:
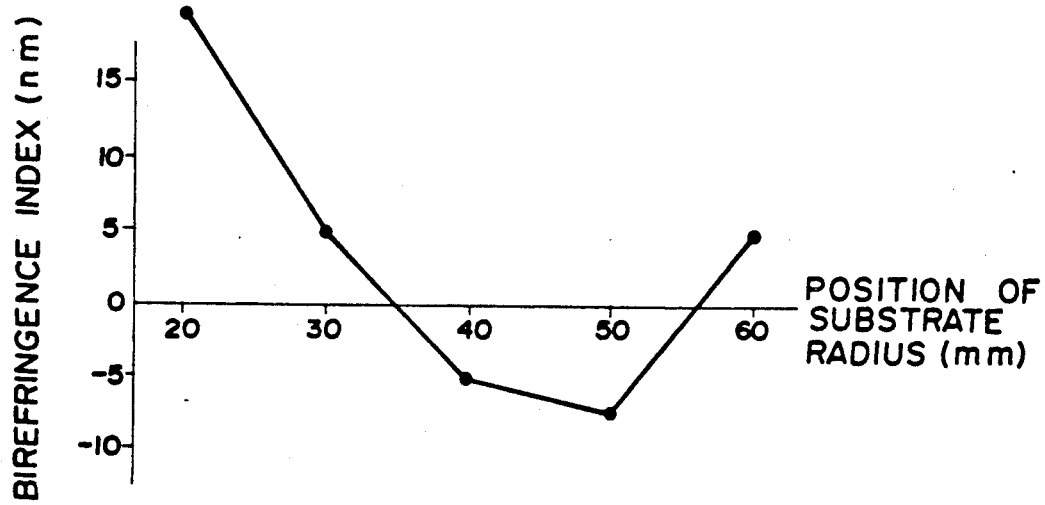
FIG. 5 is a graph illustrating a change of birefringence index likewise without the performance of injection-compression molding.

As is obvious from FIG. 4 and Table 1, the substrate injection-compression molded using the mold according to the present invention exhibits a uniform birefringence index in every section as compared with the conventional one. Moreover, the difference in thickness between the upper and lower sections of the molded piece is minimized and this makes high precision substrates available. FIG. 5 is a graph showing a change of birefringence in each section of the substrate without being compressed.

Molds and molding machines heretofore in use need arranging for specific injection-compression molding purposes and controlling in a complicated way. On the other hand, injection-compression molding can be implemented simply by providing the springs 8 for receiving clamp force between the mold parts 3, 7 and changing the clamp force in conformity with the condition in which the cavity is filled with the resin as set forth in this embodiment.

When oil pressure is utilized to control the compressive force, the reproducibility and response of the control system are limited and moreover, the conventional molding machine has been controlled by time, regardless of the condition in which the cavity is filled with the resin. On the contrary, such reproducibility, response and stability are improvable according to the present invention because the contraction and expansion of the springs 8 are utilized to directly control the compressive force in conformity with the condition in which the cavity is filled with the resin. In addition, it has posed a problem to be solved that the mold parts 3, 7 tend to tilt under their own weight during injection-compression molding. However, the drawback can be remedied since the springs are employed to support them face-to-face and a molded piece offering excellent parallelism is produced with the upper and lower sections of the mold.

Although a reference has been made to four pieces of springs 8, the number of springs need not always be four; i.e. one or a plurality of them may be used. With respect to the shape of the spring 8, use can be made of not only a coil spring but also a bar, leaf, annular or case frame spring, or any combination of them as long as they are capable of functioning as a spring, irrespective of the shape and material. The springs 8 may be fitted to any parts of the mold on condition that they are able to substantially decrease the force of pressing the mold cavity relative to the clamp force of the molding machine and to keep the stationary part 3 parallel to movable part 7. Moreover, the springs 8 may be fitted to either stationary part 3 or movable part 7, or to both of them.

EFFECT OF THE INVENTION

As set forth above, the spring members are provided between the pair of stationary and movable parts for injection-molding the molten thermoplastic resin and the bias force of the spring members is used to absorb the clamp force of the molding machine so as to reduce the force of pressing the mold cavity, so that injection-compression molding can be implemented simply by changing the clamp force in conformity with the condition in which the cavity is filled with resin. Consequently, the reproducibility, response and stability of the injection-compression molding can be improved and molded pieces of good quality are obtainable.

I claim:

1. An injection-compression mold, comprising:

a stationary part and a movable part which are used for injection-molding a molded piece from molten thermoplastic resin;

at least one spring means having one end fixed with respect to one of said stationary and movable parts and another end arranged to apply force against the other of said stationary and movable parts when said mold is clamped, said at least one spring means for decreasing a force of pressing a mold cavity by utilizing a bias force of said spring means to oppose a clamp force applied to clamp said mold to assist said molten thermoplastic resin in forcing a separation of said mold during an injection molding operation.

2. An injection-compression mold according to claim 1, wherein said spring means comprises a spring having one of a spring constant and composite spring constant $K_S$ (kgf/cm) $= F_T/S$, where $F_T$ is a predetermined clamp force (kgf) $= D \times P$, S is a compressive stroke (cm) $= t \times \alpha$, D is a projected area of molded piece (cm$^2$), P is a resin pressure (150 kgf/cm$^2$–600 kgf/cm$^2$), t is a thickness of the piece (cm) and $\alpha$ is a thickness constant 0.01–0.3.

3. An injection-compression mold controlling a clamping force in conformity with a condition in which a mold cavity is filled with a resin, said injection-compression mold comprising:

stationary mold means and movable mold means being clampable together and forming a mold cavity therebetween for use in injection-molding a molded piece from molten thermoplastic resin;

at least one spring means having one end fixed with respect to one of said stationary and movable mold means and another end arranged to apply force against the other of said stationary and movable mold means when said mold is clamped, said at least one spring means for:

decreasing, utilizing a bias force of said spring means, a clamping force exerted between said stationary mold means and movable mold means in a predetermined clamping range proximate to positions where said stationary and movable mold means contact each other, to assist said resin in effecting a subsequent forced separation of said stationary and movable mold means due to pressure from injection-molded thermoplastic resin.

4. An injection-compression mold as claimed in claim 3, wherein said at least one spring means:

decreases, utilizing a bias force of said spring means, a clamping force exerted between said stationary mold means and movable mold means in a clamping range from a maximum separation of said stationary and movable mold means due to said pressure, to a final separation of said stationary and movable mold means at a time when said molded piece reaches a predetermined cooled state.

5. An injection-compression mold as claimed in claim 3, wherein said spring means:

effects an increasing clamping force between said stationary mold means and movable mold means in a predetermined clamping range where a separation between said stationary and movable mold means changes from a minimum separation where said stationary and movable mold means contact each other to a maximum separation of said stationary and movable mold means due to said pressure; and effects a decreasing clamping force between said stationary mold means and movable mold means in a predetermined clamping range where a separation between said stationary and movable mold means changes from a maximum separation of said stationary and movable mold means due to said pressure to a final separation of said stationary and movable mold means at a time when said molded piece reaches a predetermined cooled state.

6. An injection-compression mold according to claim 5, wherein said spring means comprises a spring having one of a spring constant and composite spring constant $K_S$ (kgf/cm) $= F_T/S$, where $F_T$ is a predetermined clamp force (kgf) $= D \times P$, S is a compressive stroke (cm) $= t \times \alpha$, D is a projected area of molded piece (cm$^2$), P is a resin pressure (150 kgf/cm$^2$–600 kgf/cm$^2$), t is a thickness of the piece (cm) and $\alpha$ is a thickness constant 0.01–0.3.

* * * * *